(12) United States Patent
Adam

(10) Patent No.: US 8,958,221 B2
(45) Date of Patent: Feb. 17, 2015

(54) GRID TIED INVERTER, SYSTEM AND METHOD

(75) Inventor: Joseph John Nathaniel Adam, Cambridge (GB)

(73) Assignee: Sony Corporation, Tokyo (JP)

( * ) Notice: Subject to any disclaimer, the term of this patent is extended or adjusted under 35 U.S.C. 154(b) by 443 days.

(21) Appl. No.: 13/411,811

(22) Filed: Mar. 5, 2012

(65) Prior Publication Data

US 2012/0250373 A1  Oct. 4, 2012

(30) Foreign Application Priority Data

Mar. 29, 2011 (GB) .................................. 1105284.2

(51) Int. Cl.
| | |
|---|---|
| H02M 3/335 | (2006.01) |
| H02M 7/5387 | (2007.01) |
| H02M 3/337 | (2006.01) |
| H02J 3/38 | (2006.01) |
| H02M 7/48 | (2006.01) |
| H02M 7/44 | (2006.01) |
| H02M 1/00 | (2006.01) |

(52) U.S. Cl.
CPC ........ *H02M 7/53871* (2013.01); *H02M 3/3374* (2013.01); *H02J 3/381* (2013.01); *H02M 7/4807* (2013.01); *H02M 2001/007* (2013.01)
USPC ................. 363/98; 363/24; 363/131

(58) Field of Classification Search
USPC ............. 363/17, 24, 25, 95, 97, 98, 131, 132; 323/906
See application file for complete search history.

(56) References Cited

U.S. PATENT DOCUMENTS

| | | | |
|---|---|---|---|
| 7,339,287 B2 * | 3/2008 | Jepsen et al. ..................... | 307/82 |
| 2004/0217747 A1 | 11/2004 | Ying et al. | |
| 2007/0247877 A1 | 10/2007 | Kwon et al. | |
| 2008/0062724 A1 | 3/2008 | Feng et al. | |
| 2008/0094860 A1 | 4/2008 | Falk | |
| 2008/0266922 A1 | 10/2008 | Mumtaz et al. | |
| 2008/0304300 A1 | 12/2008 | Raju et al. | |
| 2010/0008107 A1 * | 1/2010 | Mallwitz et al. ........... | 363/21.02 |
| 2010/0133904 A1 | 6/2010 | Klodowski et al. | |
| 2012/0081933 A1 * | 4/2012 | Garrity ........................... | 363/37 |
| 2012/0127764 A1 * | 5/2012 | Phadke et al. .................. | 363/37 |
| 2012/0275201 A1 * | 11/2012 | Koyama et al. ................. | 363/40 |

OTHER PUBLICATIONS

U.S. Appl. No. 13/430,053, filed Mar. 26, 2012, Knill.
U.S. Appl. No. 13/409,831, filed Mar. 1, 2012, Knill, et al.
U.S. Appl. No. 13/412,018, filed Mar. 5, 2012, Knill.

(Continued)

*Primary Examiner* — Gary L Laxton
(74) *Attorney, Agent, or Firm* — Oblon, Spivak, McClelland, Maier & Neustadt, L.L.P.

(57) ABSTRACT

A grid tied inverter connectable to an electricity grid having a DC to DC current fed push-pull inverter to generate a current waveform from a DC voltage source. The push-pull inverter includes a transformer having a first side winding connectable to a battery and a second side winding connectable to the grid. The first end of the second side winding is connected between two diodes connected in series between a positive and negative output rail and being oriented in the same direction. The second end of the second side winding is connected between two capacitors connected in series between the positive and negative output rail. A further winding is connected at one end between the two capacitors and at its other end between another two diodes connected in series between the positive and negative output rail.

22 Claims, 11 Drawing Sheets

(56) References Cited

OTHER PUBLICATIONS

United Kingdom Search Report issued Aug. 8, 2011, in Great Britain Patent Application No. 1105284.2, filed Mar. 29, 2011.
Extended European Search Report Issued Jan. 30, 2013 in Patent Application No. 12156943.8.

Quan Li et al., "A Review of the Single Phase Photovoltaic Module Integrated Converter Topologies With Three Different DC Link Configurations", IEEE Transactions on Power Electronics, XP 011206938, vol. 23, No. 3, May 2008, pp. 1320-1333.
U.S. Appl. No. 14/055,057, filed Oct. 16, 2013, Knill.

* cited by examiner

2311: Input, primary winding
2313: Output, primary winding
2315  Input, secondary winding
2317  Output, secondary winding

US 8,958,221 B2

GRID TIED INVERTER, SYSTEM AND METHOD

BACKGROUND OF THE INVENTION

1. Field of the Invention

The present invention relates to a grid tied inverter, method and system.

2. Description of the Prior Art

It is becoming increasingly attractive for domestic consumers of electricity to provide electricity for the grid. This is particularly important given the rapid increase in electricity usage, especially during peak demand.

It is possible to provide this electricity using so-called "Grid-Tied Inverters". These are DC-DC converters which connect banks of batteries to the grid. These inverters tend to be very large and expensive.

It is an aim of the present invention to address these issues.

SUMMARY OF THE INVENTION

According to a first aspect, there is provided a grid tied inverter connectable to an electricity grid, the grid tied inverter comprising a DC to DC current fed push-pull converter operable to generate a current waveform from a DC voltage source, the current waveform being substantially synchronised to the electricity grid, the push-pull converter comprising a transformer having a first side connectable to a battery and a second side connectable to the grid, wherein each of the two primary sides is connected to ground via a switching transistor; and respective voltage clamps are connected between the respective primary side of the transformer and the respective switching transistor, the voltage clamp commutating the current from the respective primary side of the transformer when the switching transistor is turned off.

The voltage clamp may comprise a capacitor connected to ground, and a switching transistor connected in series with the capacitor.

The first side of the transformer may have a first winding which is connected to a first transistor switch and a second transistor switch, the second transistor switch is a field effect transistor having the anode of the body diode connected to the first winding, whereby the first switch is connected to ground and the second switch is connected to a first capacitor, the first capacitor being connected between the second switch and ground, wherein to allow current flow through the first winding, the first switch is configured to be on and the second switch is configured to be off, and after a predetermined period of current flow, the first switch is configured to be off, whereby a predetermined period thereafter the second switch is configured to be on.

Prior to the first switch being switched on again, the second switch may be configured to be switched off.

According to another aspect, there is provided a method of operating a grid tied inverter which is connectable to an electricity grid, the grid tied inverter comprising a DC to DC current led push-pull converter, the method comprising generating a current waveform from a DC voltage source, the current waveform being substantially synchronised to the electricity grid, the push-pull converter comprising a transformer having a first side connectable to a battery and a second side connectable to the grid, wherein each of the two primary sides is connected to ground via a switching transistor; and respective voltage clamps are connected between the respective primary side of the transformer and the respective switching transistor, wherein in the clamp, the method comprises commutating the current from the respective primary side of the transformer when the switching transistor is turned off.

The voltage clamp may comprise a capacitor connected to ground, and a switching transistor connected in series with the capacitor.

The first side of the transformer may have a first winding which is connected to a first transistor switch and a second transistor switch, the second transistor switch is a field effect transistor having the anode of the body diode connected to the first winding, whereby the first switch is connected to ground and the second switch is connected to a first capacitor, the first capacitor being connected between the second switch and ground, wherein to allow current flow through the first winding, the method comprises switching the first switch on and the second switch off, and after a predetermined period of current flow, switching the first switch off, whereby a predetermined period thereafter switching the second switch on.

Prior to the first switch being switched on again, the second switch may be switched off.

According to another aspect, there is provided a system comprising a grid tied inverter according to any one of the above embodiments connected between a DC voltage source and the grid.

There is also provided a computer program containing computer readable instructions which when loaded onto a computer configure the computer to perform a method according to any one of the embodiments.

BRIEF DESCRIPTION OF THE DRAWINGS

The above and other object, features and advantages of the invention will be apparent from the following detailed description of illustrative embodiments which is to be read in connection with the accompanying drawings, in which.

DESCRIPTION OF THE PREFERRED EMBODIMENTS

Figure 1:
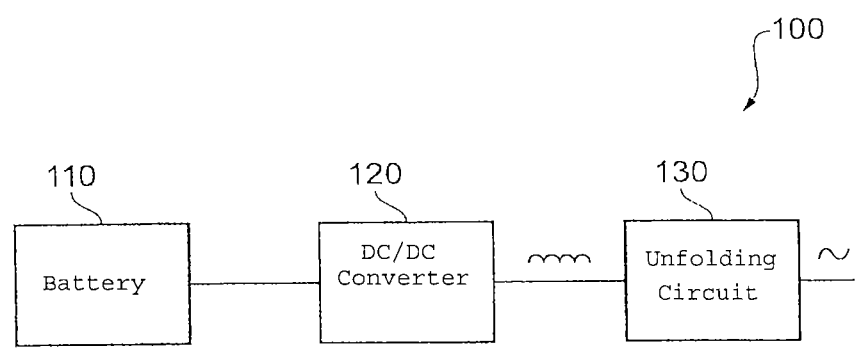
FIG. 1 shows a block diagram according an embodiment of the present invention.

With reference to FIG. 1, a system 100 is shown. The system 100 comprises a battery 110, a DC to DC converter 120 and an unfolding circuit 130. The DC to DC converter 120 and the unfolding circuit 130 form the grid tied inverter according to embodiments of the invention.

The unfolding circuit 130 is connected to a mains electricity supply provided by the mains electricity grid (not shown) and the DC to DC converter 120 is connected to the battery 110.

The battery 110 is, in embodiments, a 2 kWh battery which is typically made up of a number of battery cells. Each battery cell may be rated at 30 Ah. The battery 110 is a DC voltage source capable of delivering around 1 kW of power at any one time. The invention is not however, limited to this and any size and type of battery may be also used in embodiments.

The grid tied inverter is connected to the battery 110. The DC to DC converter 120 is connected to the battery 110 using, in embodiments, standard IEC form power inlets, which will typically include an integrated fuse unit (not shown). An example of this is a 4 pin XLR type male socket.

The output waveform from the DC to DC converter 120 is shown in FIG. 1. The output waveform from the DC to DC converter 120 is a current waveform that resembles a fully rectified signal. In other words, although the output from the DC to DC converter 120 is in fact a DC current and is not produced using a bridge circuit, it resembles and is shaped like a fully rectified signal as will be apparent from the discussion of FIG. 2.

The unfolding circuit 130 receives the fully rectified signal and switches the polarity of the output from the DC to DC converter 120 at 100 Hz to generate an AC signal that has an instantaneous voltage similar to that of the electricity grid. In other words, alternating ones of the "humps" of the current waveform generated by the DC to DC converter 120 are switched to an opposite polarity. The output of the unfolding circuit 130 is therefore an AC signal with a frequency of around 50 Hz to match that of the grid. This is shown in FIG. 1.

Although the above describes the system 100 as being suitable in one mode to transfer electricity which is stored on the battery 110 onto the grid, the system 100 can equally be used in reverse. In other words, the system 100 can operate in a second mode which allows the battery 110 to be charged using electricity supplied by the grid. Accordingly, one embodiment provides a bidirectional current fed DC to DC converter which relies on downstream unfolding circuitry to generated an AC waveform from its output.

Figure 2:
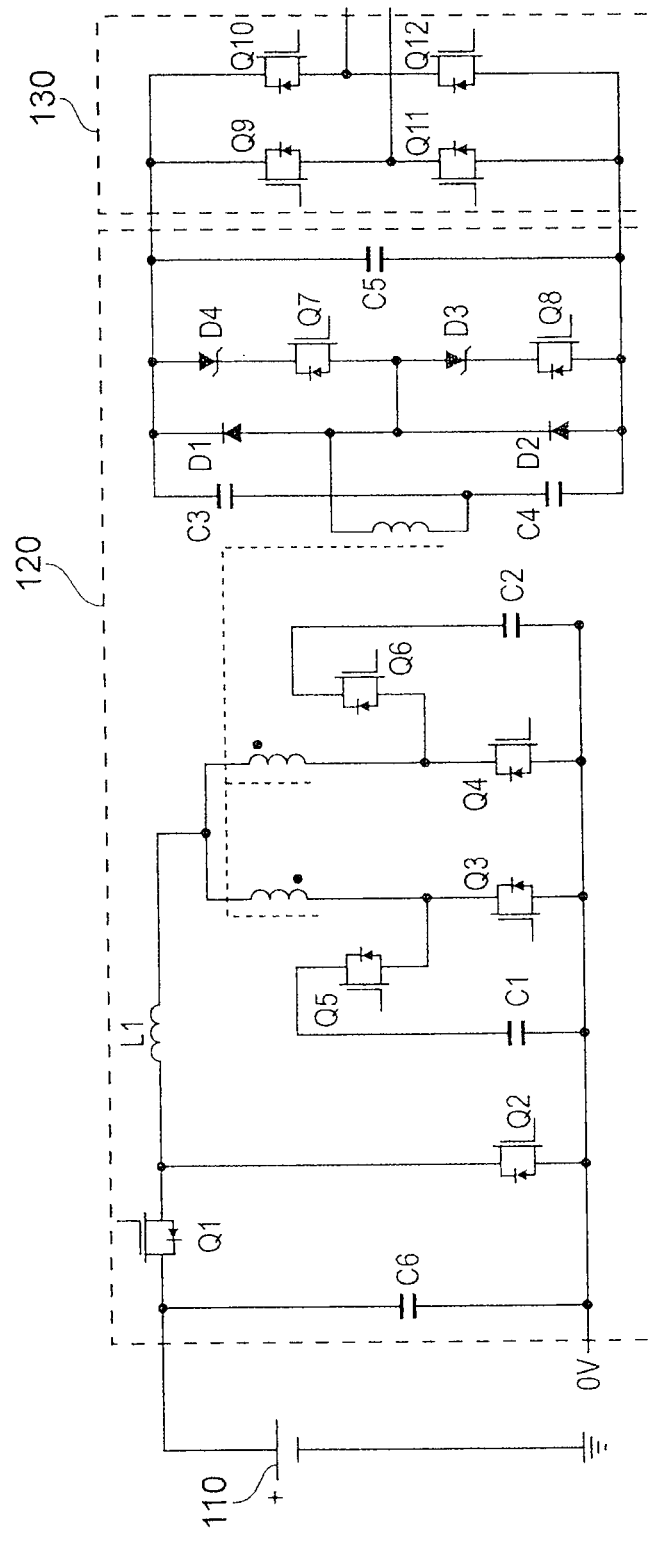
FIG. 2 shows a circuit diagram timing diagram explaining the DC-DC converter and the unfolding circuit shown in FIG. 1.

Referring to FIG. 2, the battery 110 is shown as connected to the DC to DC converter 120. The components of the DC to DC converter 120 are surrounded by a dashed box. The output of the DC to DC converter 120 is fed into the unfolding circuit 130 whose components are surrounded by another dashed box.

The operation of the DC to DC converter 120 will be described in more detail with reference to FIG. 3. However, a description of the structure of the DC to DC converter 120 and the unfolding circuit 130 will be provided with reference to FIG. 2.

The battery 110 is shown as a single cell device in FIG. 2 connected to the DC to DC converter 120. However, as noted above, in embodiments, the battery 110 comprises a plurality of cells.

The battery 110 is connected across a decoupling capacitor C6. A first terminal of a first switching transistor Q1 is connected in series with the battery 110. Connected between the second terminal of the first switching transistor Q1 and ground is a second switching transistor Q2. A first terminal of a first inductor L1 is connected to the second terminal of the first switching transistor Q1. The first switching transistor Q1, the second switching transistor Q2 and the first inductor L1 are arranged as a synchronous buck converter. The second terminal of the first inductor L1 is connected to a split primary winding of a transformer. In embodiments, the second terminal of the first inductor L1 is connected to a first terminal of a first primary winding of the transformer and a first terminal of a second primary winding of the transformer.

The first terminal of a third switching transistor Q3 is connected to the second terminal of the first primary winding and the second terminal of the third switching transistor Q3 is connected to ground. The first terminal of a fourth switching transistor Q4 is connected to the second terminal of the second primary winding and the second terminal of the fourth switching transistor Q4 is connected to ground.

A first terminal of a fifth switching transistor Q5 is connected between the second terminal of the first primary winding and the first terminal of the third switching transistor Q3. A first capacitor C1 is connected between the second terminal of the fifth switching transistor Q5 and ground. A first terminal of a sixth switching transistor Q6 is connected between the second terminal of the second primary winding and the first terminal of the fourth switching transistor. A second capacitor C2 is connected between the second terminal of the sixth switching transistor Q6 and ground.

A first terminal of the secondary winding of the transformer is connected to a second terminal of a third capacitor C3 and the first terminal of a fourth capacitor C4. The second terminal of the fourth capacitor C4 is connected to a negative rail. The first terminal of the third capacitor C3 is connected to a positive rail. A cathode terminal of a first diode D1 is also connected to the positive rail. The anode terminal of the first diode D1 is connected to a second terminal of the secondary winding of the transformer. The cathode terminal of a second diode D2 is also connected to the second terminal of the secondary winding of the transformer. The anode terminal of the second diode D2 is connected to the negative rail.

The cathode terminal of the second diode D2 is connected to the anode terminal of a third diode D3. An eighth switching transistor Q8 is connected between the between the cathode terminal of the third diode D3 and the negative rail. A second terminal of a seventh switching transistor Q7 is connected to the second terminal of the secondary winding of the transformer. The first terminal of the seventh switching transistor Q7 is connected to the cathode terminal of a fourth diode D4. The second terminal of the fourth diode D4 is connected to the positive rail. A fifth capacitor C5 is connected between the cathode terminal of the fourth diode D4 and the negative rail. It should be noted here that the third and fourth diodes D3 and D4 are Schottky diodes which exhibit a fast switching capability and which have a low forward voltage drop.

As noted before, connected to the DC-DC converter 120 is an unfolding circuit 130. The unfolding circuit 130 is connected in parallel to the fifth capacitor C5. The unfolding circuit 130 includes a ninth to twelfth switching transistor Q9-Q12. The ninth switching transistor Q9 has a first terminal connected to the positive rail and a second terminal connected to a negative output line. The tenth switching transistor Q10 is connected between the positive rail and a positive output line. The eleventh switching transistor Q11 is connected between the negative output line and the negative rail, and the twelfth switching transistor Q12 is connected between the negative rail and the positive output line. The positive and negative output lines connect to the electricity grid. In embodiments, filter circuitry is provided between the positive and negative output lines and the electricity grid.

It should be noted here that the ninth to twelfth switching transistors Q9 to Q12 are power MOSFET (Metal Oxide Semi-conductor Field Effect Transistors) transistors. This means that a diode exists between the drain (cathode) and source (anode) of the MOSFET. This is sometimes referred to as the "body diode" and exists in any field effect type transistor. In the ninth switching transistor Q9 the drain is connected to the positive rail, in the tenth switching transistor Q10 the drain is connected to the positive rail, in the eleventh switching transistor Q11, the drain is connected to the negative output rail and in the twelfth switching transistor Q12, the drain is connected to the positive output rail.

In other words, in the first mode (battery to grid), the ninth to twelfth switching transistors Q9 to Q12 are switched to generate an appropriate output waveform, and in the second mode (grid to battery), the ninth to twelfth switching transistors Q9 to Q12 are not switched meaning that the body diode between the drain and source of each MOSFET cause the ninth to twelfth switching transistors Q9 to Q12 to operate as a full bridge rectifier which produces a fully rectified signal across the fifth capacitor C5. This ensures that the grid tied inverter can operate in both modes and is therefore bi-directional. This reduces the size and cost of the grid tied inverter which might conventionally have had one circuit operating in the first mode and a second, parallel, circuit operating in the second mode.

Figure 3:
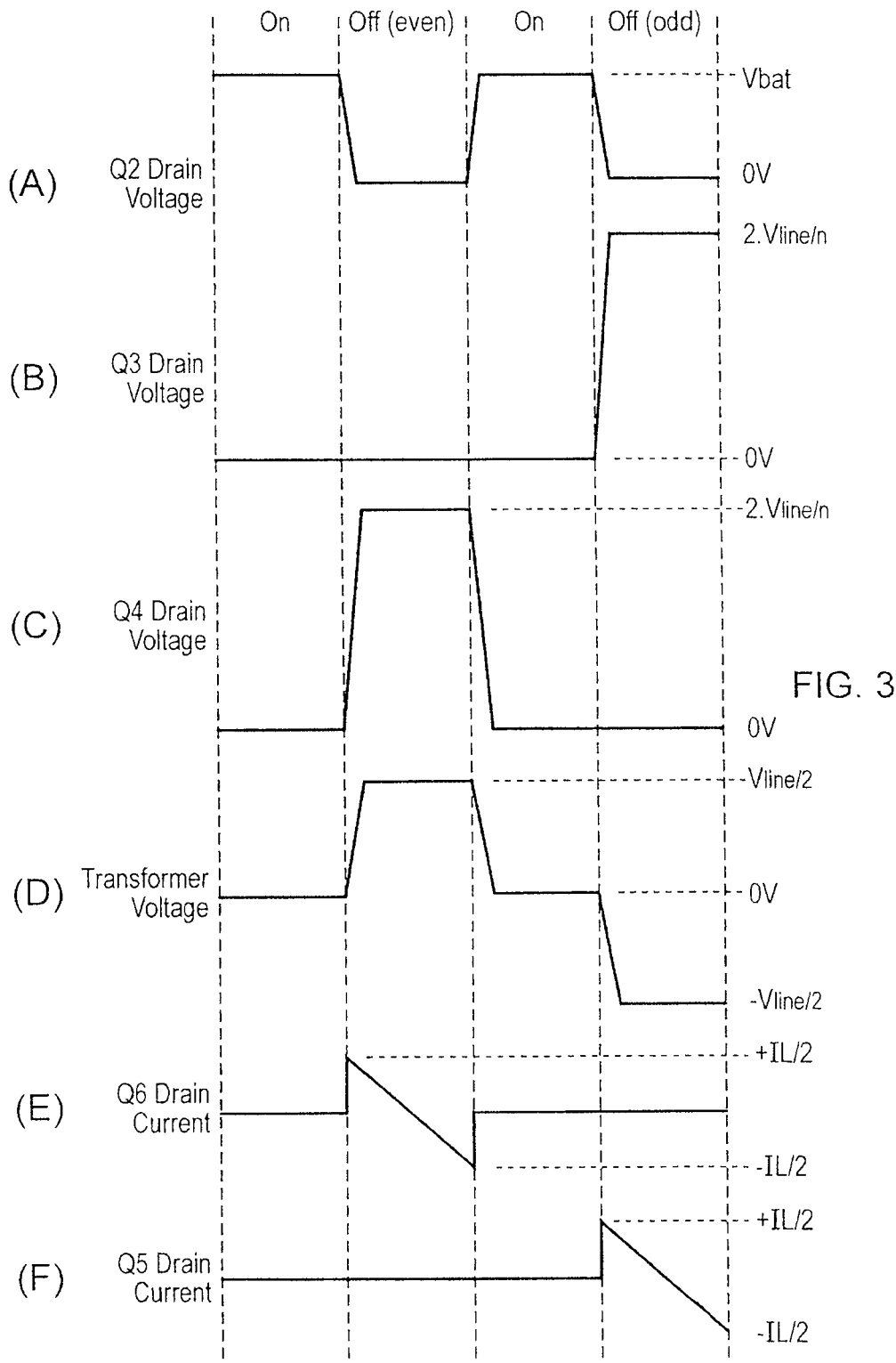
FIG. 3 shows a timing diagram associated with the circuit diagram of FIG. 2.

Referring to FIG. 3, an explanation of the operation of the DC to DC converter 120 will now be given.

As will be appreciated by the skilled person, the DC to DC converter 120 is configured as a current fed push-pull converter. In other words, the output from the DC to DC converter 120 resembles a rectified current signal. This is different to conventional DC to DC converter 120 in grid tied inverters which produce voltage waveforms. However, any minor differences between the voltage waveform generated by the grid tied inverter and the grid onto which the electricity is fed will result in large currents being generated (due to the low resistance of the grid and filters placed between the grid tied inverter and the grid). Therefore, conventionally, designers have altered the resistance characteristics of the filters to mitigate the large current values. However, this is very complicated and results in complex circuitry.

In order to address this, the output from the DC to DC converter 120 is a current waveform. This reduces the need to adjust the filter resistance and therefore reduces circuitry complexity.

In order to generate the current waveform, the duty cycle of the DC to DC converter 120 is adjusted. The control mechanism to generate the duty cycle will be explained later with reference to FIG. 5.

In addition to the DC to DC converter 120 being configured as a current fed push-pull converter, additional switches Q1 and D2 are included as shown in FIG. 2. The inclusion of the switches Q1 and Q2 provide an advantage. Although not conventional in the field of grid tied inverters, if a current fed push-pull converter was used, it would only be possible to produce current for an output line voltage above n.Vbat (where n is the turns ratio of the transformer). In other words, it would only be possible to generate an output voltage waveform between n.Vbat and the peak voltage of the domestic supply. This is because for output line voltages below this value, the voltage across the inductor L1 would be 0V as the reflected voltage at the transformer side of L1 would be equal to Vbat.

In order to generate an output line voltage across the range 0V to peak line voltage (which in embodiments is 325V), when the voltage of the line drops to n.Vbat, additional switches Q1 and Q2 are added. These two switches form a Buck-Boost circuit. It is possible for the DC to DC converter 120 to continuously operate in Buck-Boost mode. However, in order to reduce switching losses, the Buck-Boost switches are only operated when the line voltage is equal to of less than n.Vbat. In other words, as the Buck-Boost mode is only required when the line voltage is at or below n.Vbat, the Buck-Boost mode is only operated when the line voltage is at or below n.Vbat.

In order to determine when to operate Buck-Boost mode, the voltage across the battery is monitored. The product of the voltage across the battery and the turns ratio of the transformer is calculated. This is compared with the instantaneous output line voltage. When the result of this comparison indicates that the output line voltage is less than the product of the voltage across the battery and the turns ratio of the transformer, the Buck-Boost mode is activated. It should be noted that the mechanism to monitor the voltages and perform the calculation are not described hereinafter as they would be appreciated by the skilled person. For example, the process could be handled by a digital signal processor based on voltage samples taken from the DC to DC converter circuitry.

In the following description, it should be noted that Q1 and Q2 are switched. In other words, in the following description, the operation of the circuit in Buck-Boost mode will be described.

During the "on" time of the duty cycle, Q1, Q3 and Q4 are switched on (i.e. the switch is closed). In order to avoid "shoot-through" (i.e. a shorted path to ground), Q2 is switched "off" or is an open switch. As can be seen in graph A of FIG. 3, the drain voltage of Q2 during the "on" time is the battery voltage. As Q3 and Q4 are switched on, the voltage across both primary windings is 0V. Accordingly, the battery voltage appears across the first inductor L1. This means that current (IL) flows through the first inductor L1 and that current flows in the first and second primary winding of the transformer. In embodiments, current IL/2 will flow in each of the first and second primary winding. As would be appreciated by the skilled person, as no voltage appears across the first and second primary winding, no voltage will appear across the secondary winding. Accordingly, the output of the DC to DC converter 120 will be the current supplied by the fifth capacitor C5.

During the "off" time of the duty cycle, Q1 is switched off and Q2 is switched on. In order to avoid shoot-through, there is a slight delay between these transitions. During the first "off" time, Q3 is left on and Q4 is switched off. As Q1 is switched off, the voltage across the first inductor L1 reverses. The sixth switching transistor Q6 is a MOSFET transistor. Therefore, the drain of the sixth switching transistor Q6 is connected to the second capacitor C2. Accordingly, even though the sixth switching transistor Q6 is switched off, the diode effect within the sixth switching transistor Q6 acts as a commutation diode to reduce the effect of the sudden change in the voltage across the second primary winding of the transformer. The commutation diode clamps the peak voltage across the fourth switching transistor Q4 to 2Vline/n where Vline is the instantaneous voltage of the grid and n is the turns ratio of the transformer, which in embodiments is 3 (i.e. 3 times the number of coils on the secondary side of the transformer compared with the totality of the primary side).

After a short delay of around 20 ns the sixth switching transistor Q6 is switched on allowing current reversal. In other words, when Q6 is switched on, current can flow out of the second capacitor C2 through Q6. As current flows through the second primary winding, via Q6 and the second capacitor C2, a voltage is induced in the secondary winding. This forward biases first diode D1 and therefore transfers energy to the unfolding circuit 130. This is shown by graph D in FIG. 3.

As is shown in graph F of FIG. 3, the drain current through the sixth switching transistor Q6 varies linearly over the off time of the duty cycle from +Il/2 to −Il/2. This is because the amp-seconds balance on clamp capacitor C2 must be maintained. During the subsequent "on" part of the duty cycle, Q4 needs to be switched on and Q6 needs to be switched off. It is advantageous to switch Q6 off slightly before Q4 is switched on. This is because as the current has reversed, the voltage across Q4 collapses allowing the turn-on of Q4 under zero voltage conditions. This reduces switching losses and therefore improves the efficiency of the DC to DC converter 120.

The next "on" time of the duty cycle is performed. In this, the switches and operation is the same as the previous "on" time and so will not be repeated here.

The next "off" time of the duty cycle is very similar to that explained above. However, during this "off" time, Q4 is left on and Q3 is switched off. Accordingly, Q5, which is a MOSFET switch, has a diode effect across its body which commutates the current through the first primary winding of the transformer. Therefore, the voltage across Q3 is 2VLine/n. Again, Q5 is switched on a short time later and the current reverses. This means that the voltage across the transformer is −Vline/2. As shown in graph F of FIG. 3, during this second "off" time, the drain current through Q5 varies linearly over the off time of the duty cycle from +Il/2 to −Il/2. Therefore, during the next "on" cycle, Q5 is switched off slightly before Q3 is switched on and again, the voltage across Q3 collapses allowing the turn-on of Q3 under zero voltage conditions.

As noted above, this explanation refers to the circuit operating in Buck-Boost mode. In other words, the above describes the operation of the DC to DC converter 120 when the line voltage is less than or equal to n.Vbat. When the line voltage is greater than n.Vbat, the DC to DC converter will operate in a Boost mode. In this situation, the switching of all the transistors is the same except Q2 is always off. Therefore, in the case that the DC to DC converter 120 is operating in the Boost mode, the voltage across L1 during the off-time drops from Vline/n to (Vline/n)−Vbat.

This means that when the DC to DC converter 120 switches between operating in Boost mode to Buck-Boost mode, the current through the inductor L1 can change rapidly. In order to reduce the effect of this, the Buck-Boost mode is activated slightly early. In other words, although it is possible to start operating in Buck-Boost mode when the line voltage is less than or equal to n.Vbat, the DC to DC converter 120 begins operating in Buck Boost mode when the output line voltage is n.Vbat+δ (where δ is a small voltage around 1.5V). Similarly, although it is possible to stop operating in Buck-Boost mode when the line voltage is greater than n.Vbat, the DC to DC converter 120 stops operating in Buck-Boost mode (and in Boost mode alone), when the output line voltage reaches n.Vbat+δ.

Although the above describes activating the Buck-Boost mode early by identifying when the output line voltage reaches n.Vbat+δ, potentially noise on the output line could inadvertently trigger a switch in the mode. In order to reduce the possibility of this, in embodiments the timing of the switch is changed. In other words, the Buck-Boost mode is triggered earlier in time than would normally be anticipated (rather than using voltage as the trigger). In order to achieve this, the phase of the output line voltage is monitored. During a complete cycle of the output voltage, the phase of the output will vary between 0 and 360°. The phase selected as the change over phase varies depending on the ratio of output line voltage to battery voltage. However, in typical embodiments, the phase at switch will be around 37°.

As noted hereinbefore, the above allows the DC to DC converter 120 to generate a current waveform that resembles a fully rectified AC current waveform at the output of the DC to DC converter 120. In order to apply this to the grid, the unfolding circuit 130 needs to generate a full-wave rectified sinusoid having an instantaneous voltage matching the grid. In order to achieve this, the unfolding circuit 130 is commutated at 100 Hz. In other words, the switching transistors Q10 and Q11 are commutated as one pair, and switching transistors Q9 and Q12 are commutated as a second pair. By commutating the switching transistors in this manner, the switching losses are reduced compared to conventional techniques where typical bridges are commutated at higher frequencies such as 20-50 kHz.

As noted above, the output current from the DC to DC converter 120 flows in D1 and D2. These two diodes act as rectifier diodes. Q7 and Q8 are MOSFETs. As such, they have body diodes. Q7 and Q8 also operate only when the grid tied inverter operates in the grid to battery mode as will be explained later. Therefore, during the battery to grid mode (or first mode) Q7 and Q8 are left off. However, even though Q7 and Q8 are off, as Q7 and Q8 are field effect transistors, they have a body diode effect even when switched off. To prevent the reverse recovery current of the body diodes from reducing efficiency, Schottky diodes D3 and D4 prevent current flow onto the positive and negative lines. In other words, Schottky diodes D3 and D4, are orientated to oppose the orientation of the body diodes of Q7 and Q8. If the Schottky diodes D3 and D4 were not present, the reverse recovery current of these body diodes circulates and appear on the primary side of the transformer. In embodiments, the reverse recovery current appears in the loop comprising of Q3 and Q4 during the "on" time. This increases the conduction losses for these devices. It should be noted here that any other type of diode would suffice (i.e. Schottky diodes are not necessary). However, Schottky diodes are better than any other type of diode because they have a lower turn on voltage which improves the efficiency of the circuit.

The operation of the circuit in the second mode (or grid to battery mode) will now be described. In the second mode, the transistors Q9 to Q12 (unfolding circuitry) are not switched, and remain static to form a rectifier circuit. In order to operate in the second mode, Q7 and Q8 are switched. Clearly, in order to avoid cross conduction, Q7 and Q8 are not switched to be "on" at the same time.

During the even "on" time during the grid to battery mode Q7 is switched on meaning that Q8 remains off. Current flows from the grid, through D4 and into the transformer winding (via C3). This induces a voltage of Vline/2 across C3 and thus the transformer winding. In buck-boost mode during the grid to battery mode, Q3 and Q6 are on, Q1 is off, and Q2 is on. This results in a voltage of n.Vline/2 being applied across L1. Due to the split winding, a voltage of Vline/n appears across Q4.

During the buck-boost "off" time, Q6 is switched off first. This reduces the voltage across Q4 to zero so that when Q4 is switched on during the next buck-boost "on" time, Q4 can be switched under zero voltage conditions which reduces losses significantly. This has already been explained with reference to the battery to grid mode. It should be noted however that during this "off" time, Q4 is still off. Additionally, Q7 is switched off. Thus, during this "off" time, Q6, Q7 and Q8 are off and Q2, Q3 and Q4 are on. Accordingly, the transformer voltage is zero with a current of IL/2 flowing through each of the primary winding legs. The voltage across L1 is therefore Vbat.

During the odd "on" time, Q8 is switched on and Q7 is off. Current flows from the grid, through D3 and into the transformer winding (via C4). This induces a voltage of Vline/2 across C4 and thus the transformer winding. Therefore, a voltage of n.Vline/2 appears across L1.

It should be noted that the voltage appearing across nVline/2 assumes that the voltage across C3 and C4 is the same during each switching cycle. Although for the majority of cases, this is correct, there is a slight possibility that this may not always be the case. In the case that the voltage across C3 and C4 is not the same during each switching cycle, an imbalance in L1 occurs. This is because the voltage across C3 and C4 during the respective cycles appears across the transformer which charges L1. Therefore, over a number of cycles, the imbalance in L1 increases the difference between the voltages across C3 and C4. In other words, the presence of L1 acts to increase a voltage difference across the transformer during successive "odd" and "even" on times. This positive feedback results in saturation of the transformer core. As would be appreciated, during saturation, the transformer acts as a short circuit. As will be explained later, a balance winding may be introduced into the circuit to mitigate this effect.

Figure 4:
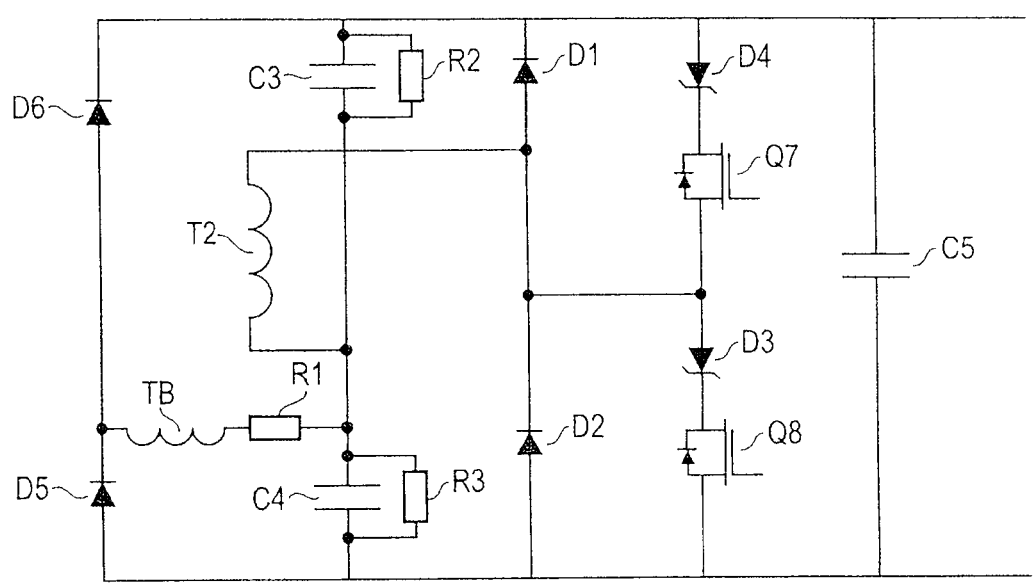
FIG. 4 shows the secondary side of the transformer according to embodiments of the present invention.

An example circuit configuration for the balance winding is schematically illustrated in FIG. 4. As will be appreciated from a comparison of FIG. 4 and FIG. 2, FIG. 4 shows a portion of the secondary side circuitry of the DC-DC inverter 120 shown in FIG. 2, with like circuit elements being indicated with like reference numerals. The secondary side transformer winding is identified in FIG. 4 as T2. In addition, FIG. 4 shows a number of additional circuit elements which are intended to prevent, or at least reduce, the incidence of transformer saturation. This additional circuitry includes a further winding TB which is connected at one end via a resistor R1 between the capacitor C3 and the capacitor C4, and is connected at its other end between a diode D5 and a diode D6. The diodes D5 and D6 are connected in series between the positive output rail and the negative output rail and are both oriented in the same direction (that is, towards one or other of the positive output rail and the negative output rail) as the diode D1 and the diode D2.

As will be appreciated, it is desirable that the end of the transformer winding T2 between the capacitors C3 and C4 be stable. In an ideal circuit, the voltage drop across C3 and C4 would be identical, achieving this, but in a real circuit an imbalance may arise at this point, resulting in transformer saturation. This is mitigated in the present case by the further winding TB which functions as one half of a potential divider, with the transformer winding T2 serving as the other half of the potential divider. It will be appreciated that, by configuring T2 and TB to store substantially the same amount of energy, for example by using the same or a similar number of transformer turns for each winding, the mid point between T2 and TB, and thus the mid point between the capacitors C3 and C4, can be stabilised. The resistor R1 serves to reduce the effect of ripple voltages on the windings, with any ripple voltages becoming superimposed across the resistor R1. If the resistor R1 was not present, a large current would flow through the balance winding.

In addition to the potential divider provided by the further winding TB, the midpoint between the capacitors C3 and C4 is also stabilised by connecting resistors R2 and R3 across the capacitors C3 and C4. The resisters R2 and R3 have substantially the same resistance, and form a further potential divider between the positive and negative rails to stabilise the mid point while the grid tied inverter is not switching.

Returning to the discussion about the grid to battery mode, as with the even "on" time, Q1 is off and Q2 is on. However, unlike the even "on" time, Q4 is switched on (under zero voltage conditions explained above), and Q5 is switched on. Q6 remains off and Q3 is switched off. The operation of the circuit is then similar to that explained with reference to the even "on" time. However, during the next "off" time, Q5 is switched off first so that when Q3 is switched on during the next buck-boost "on" time, Q5 can be switched under zero voltage conditions.

As with the battery to grid mode, in boost mode, Q1 is left on for the entire switching cycle to reduce the voltage across the inductor during the on time from Vline/n to (V line/n)−Vbat.

Figure 5:
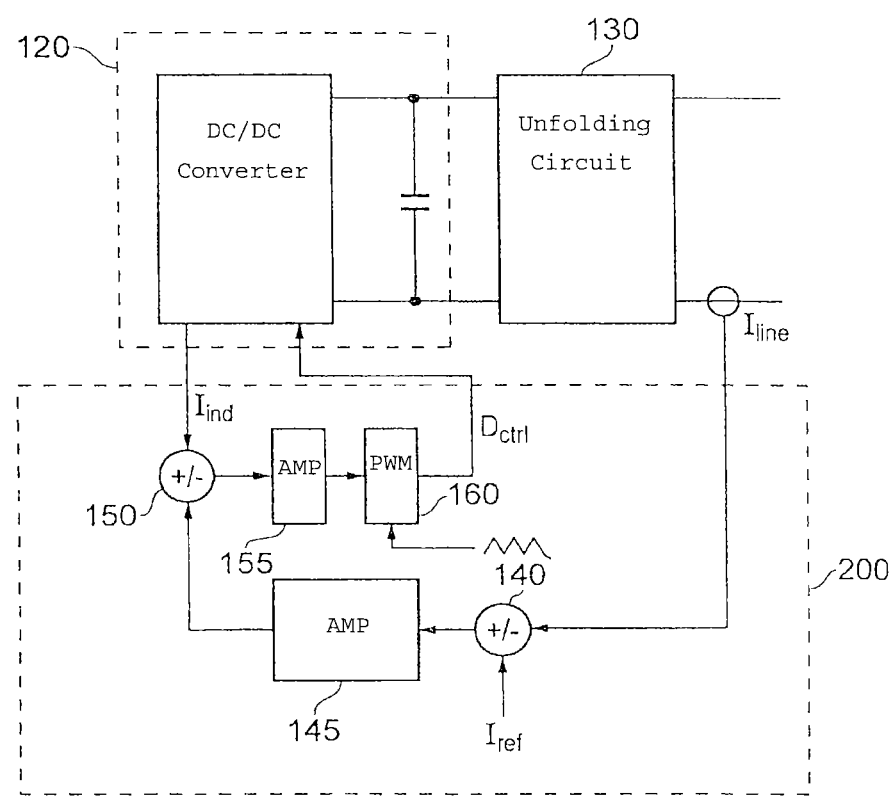
FIG. 5 shows a control loop which controls the duty cycle of the circuit shown in FIG. 2.

Control of the push-pull converter is implemented in part by setting the duty cycle of the DC-DC converter 120. More particularly, the ratio of the "on" time to the "off" time is varied with respect to time to generate a desired current waveform. The desired current waveform for output by the DC-DC converter 120 resembles a fully rectified AC current waveform. In one embodiment, this is achieved by way of a DSP (Digital Signal Processor) set reference current and inner and outer control loops. FIG. 5 schematically illustrates such a control circuit 200 and its connections to the DC-DC converter 120 and unfolding circuitry 130.

The control circuit 200 comprises an outer loop comparator 140 which receives a line current output $I_{line}$ from the unfolding stage 130 and a digitally synthesised reference current $I_{ref}$ received from a DSP (not shown). The outer loop comparator 140 generates an outer loop error signal $\epsilon_{outer}$ from the difference ($I_{line}-I_{ref}$) between the received line current $I_{line}$ and the reference current $I_{ref}$ and passes this to an outer loop error amplifier 145. The outer loop comparator 140 and the outer loop error amplifier 145 serve as an outer control loop. The outer loop error amplifier 145 amplifies the outer loop error signal $\epsilon_{outer}$ generated by the outer loop comparator 140 and passes it to an inner loop of the control circuit 200 as $E_{outer}$. In particular, the inner loop comprises an inner loop comparator 150 which receives the amplified outer loop error signal $E_{outer}$ from the outer loop and a measured inductor current $I_{ind}$ from the DC-DC converter 120. The inner loop comparator 150 generates an inner loop error signal $\epsilon_{inner}$ from the difference ($I_{ind}-E_{outer}$) between the measured inductor current $I_{ind}$ and the amplified error signal $E_{outer}$ from the outer loop. The inner loop error signal $\epsilon_{inner}$ is then passed to an inner loop error amplifier 155 which amplifies the inner loop error signal generated by the inner loop comparator 150 and passes it to a pulse width modulator 160, which used the amplified outer loop error signal to modulate a saw tooth reference waveform to form a duty cycle control signal $D_{ctrl}$. The duty cycle control signal $D_{ctrl}$ then serves to control the timing of the switching of the various transistors described in FIG. 2. It will be appreciated that the duty cycle control signal $D_{ctrl}$ may not directly control all of the switches—in some cases an offset or inverted version of the duty cycle control signal $D_{ctrl}$ will be used to drive a particular switch, resulting in a desired relative timing delay between particular switch transitions.

It will be appreciated that the amplified outer loop error signal $E_{outer}$ represents a difference between the output current presently being output from the unfolding stage 130 and a digitally controlled reference current. It will be understood that the digitally controlled reference current is in effect a target current which the analogue circuitry of the DC-DC converter and the unfolding stage 130 is intended to follow. This outer loop process therefore drives a relatively slow change in the desired output line current. The inner control loop on the other hand changed rapidly as a function of the inductor current. The inductor current is in effect modulated in a particular direction by the error signal generated from the outer control loop to achieve the desired gradual change in line current via the duty cycle control signal $D_{ctrl}$.

As discussed above, the DC-DC converter is operable in both a buck boost mode and a boost mode. The purpose of the buck boost mode is to permit the output voltage to reach 0V, which is necessary in generating the desired output waveform. However, the additional transistor switching results in undesirable switching losses in the transistor Q2. In order to reduce the impact of these switching losses, the buck boost mode is active only during generation of a lower portion of a voltage waveform. During the upper portion of the voltage waveform the buck boost topology is not necessary to obtain the required voltage levels, and so a boost mode is used in which the transistor Q2 remains on.

Although the foregoing has been discussed with reference to a battery or batteries being the DC source, the invention is not so limited. Any type of DC source may be equally used.

Also, although the foregoing has been described with reference to circuit elements, in embodiments these elements may be controlled by a computer program. Such a computer program comprises computer readable instructions which, when loaded onto a computer configure the computer to perform the method of the embodiments. This program may be stored on a storage medium such as an optical disc or on a server for distribution on a network. The software may be stored on memory within the grid tied inverter which may provide the switching timings, for example using the digital signal processor.

The above DC-DC converter comprises a transformer. Various transformer types are possible. Planar transformers, for example providing windings mounted on a plurality of printed circuit boards, are known. A problem with such transformers is that the plural printed circuit board need to be structurally and electrically connected together during the assembly and manufacture process. More particularly, in a conventional planar transformer the windings would be separately soldered or welded together. It is believed that an increase in efficiency can be accomplished by creating the transformer from stamped parts or PCB sections and connecting these components using the main PCB, rather than directly. This may be better from an assembly and manufacturing perspective.

Figure 6A:
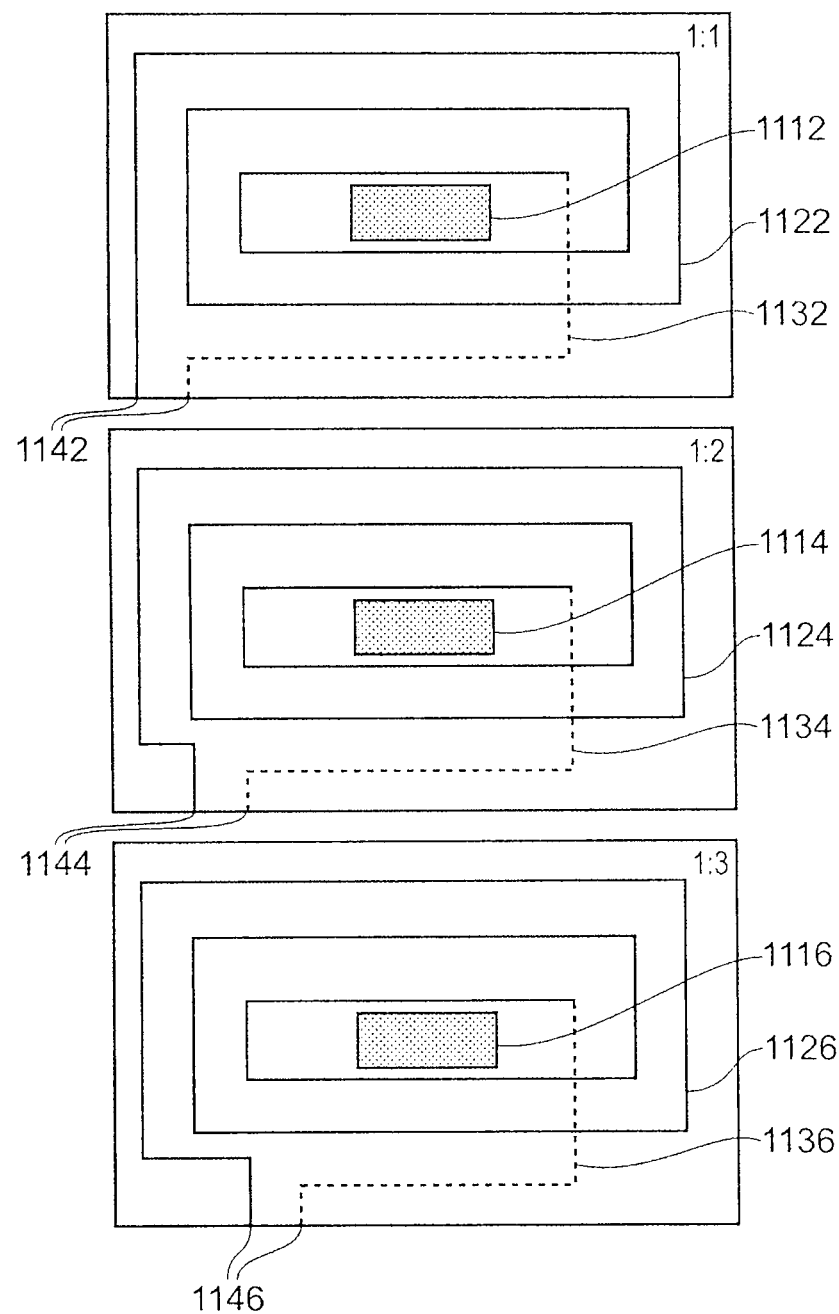
FIGS. 6A to 6C show a first configuration of planar transformer.
Figure 6B:
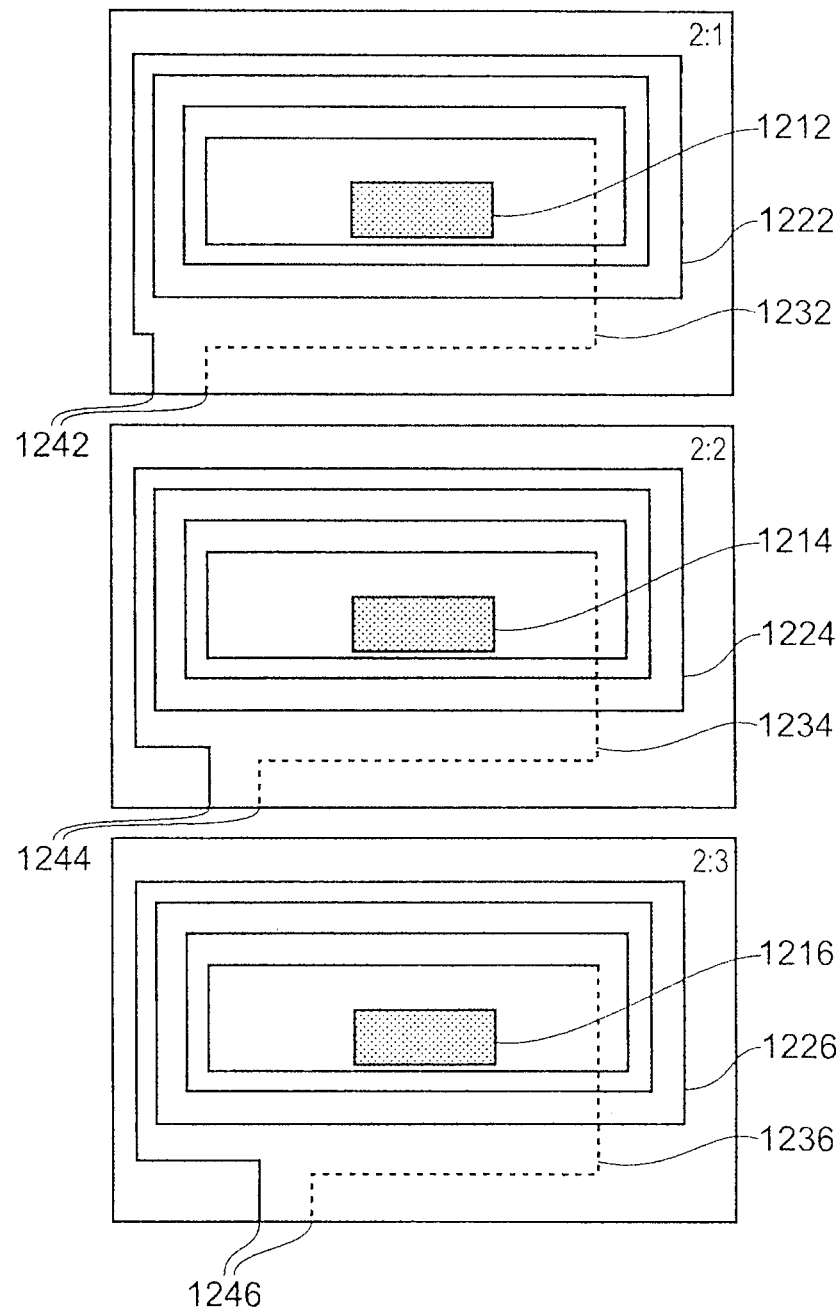
Figure 6C:
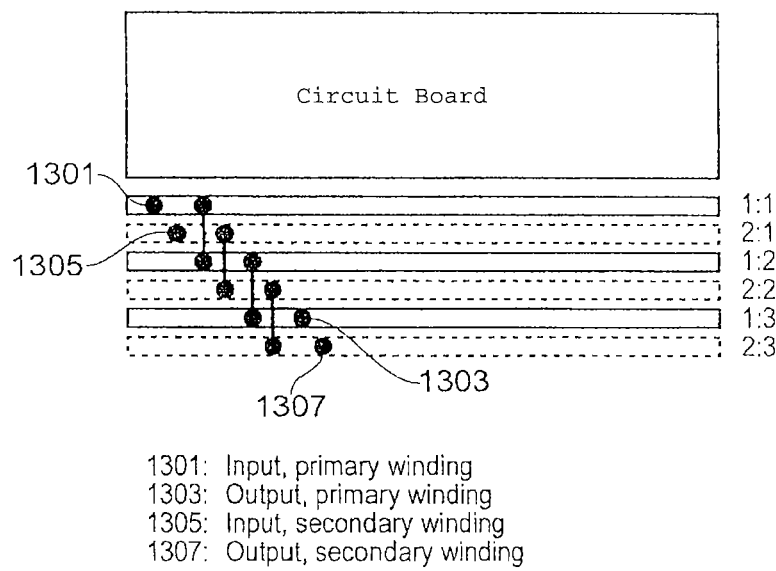

Referring to FIGS. 6A to 6C, a first configuration of such a planar transformer, utilising a stepped design, is schematically illustrated. Referring first to FIG. 6A, a primary winding is formed over three cards, 1:1, 1:2 and 1:3, each with a core receiving aperture 1112, 1114, 1116, a first side winding track 1122, 1124, 1126, a second side winding track 1132, 1134, 1136 and different terminal positions 1142, 1144, 1146 at the edge of the respective card. Each of the primary cards is intended for location in a respectively labelled slot in FIG. 6C. A secondary winding is shown in FIG. 6B, and is formed over three cards, 2:1, 2:2 and 2:3, again each with a core receiving aperture 1212, 1214, 1216, a first side winding track 1222, 1224, 1226, a second side winding track 1232, 1234, 1236 and different terminal positions 1242, 1244, 1246 at the edge of the respective card. Each of the secondary cards is located at a respectively labelled slot in FIG. 6C. FIG. 6C illustrates six slots of a motherboard to which the PCR transformer (in the form of the six cards of FIGS. 6A and 6B) is to be mounted. Connections between the slots in the motherboard serve to complete the circuits of the primary and secondary windings by connecting together the six cards. In a slot 1:1 dedicated to the card 1:1, an input connection 1301 is provided which serves as a first terminal for the primary winding. The other connection shown in slot 1:1 is used to connect to the slot 1:2 dedicated to the card 1:2. The slot 1:2 is connected to the slot 1:3 in a like manner. The slot 1:3 comprises an output connection 1303 which serves as a second terminal for the primary winding. In a slot 2:1 dedicated to the card 2:1, an input connection 1305 is provided which serves as a first terminal for the secondary winding. The other connection shown in the slot 2:1 is used to connect to the slot 2:2 dedicated to the card 2:2. The slot 2:2 is connected to the slot 2:3 in a like manner. The slot 2:3 comprises an output connection 1307 which serves as a second terminal for the secondary winding. The edge terminals of the cards and slots are stepped between cards to permit connections between slots.

Figure 7A:
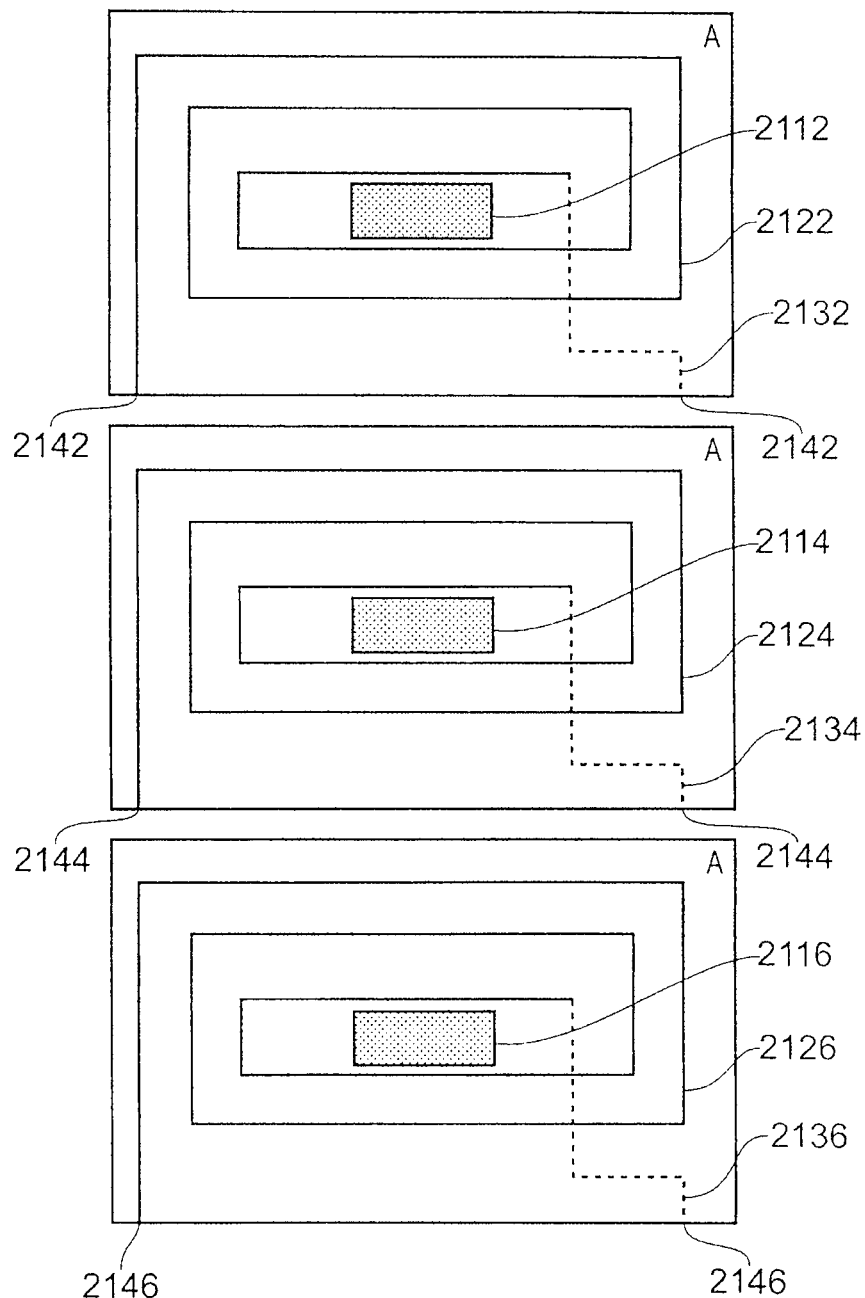
FIGS. 7A to 7C show a second configuration of planar transformer.
Figure 7B:
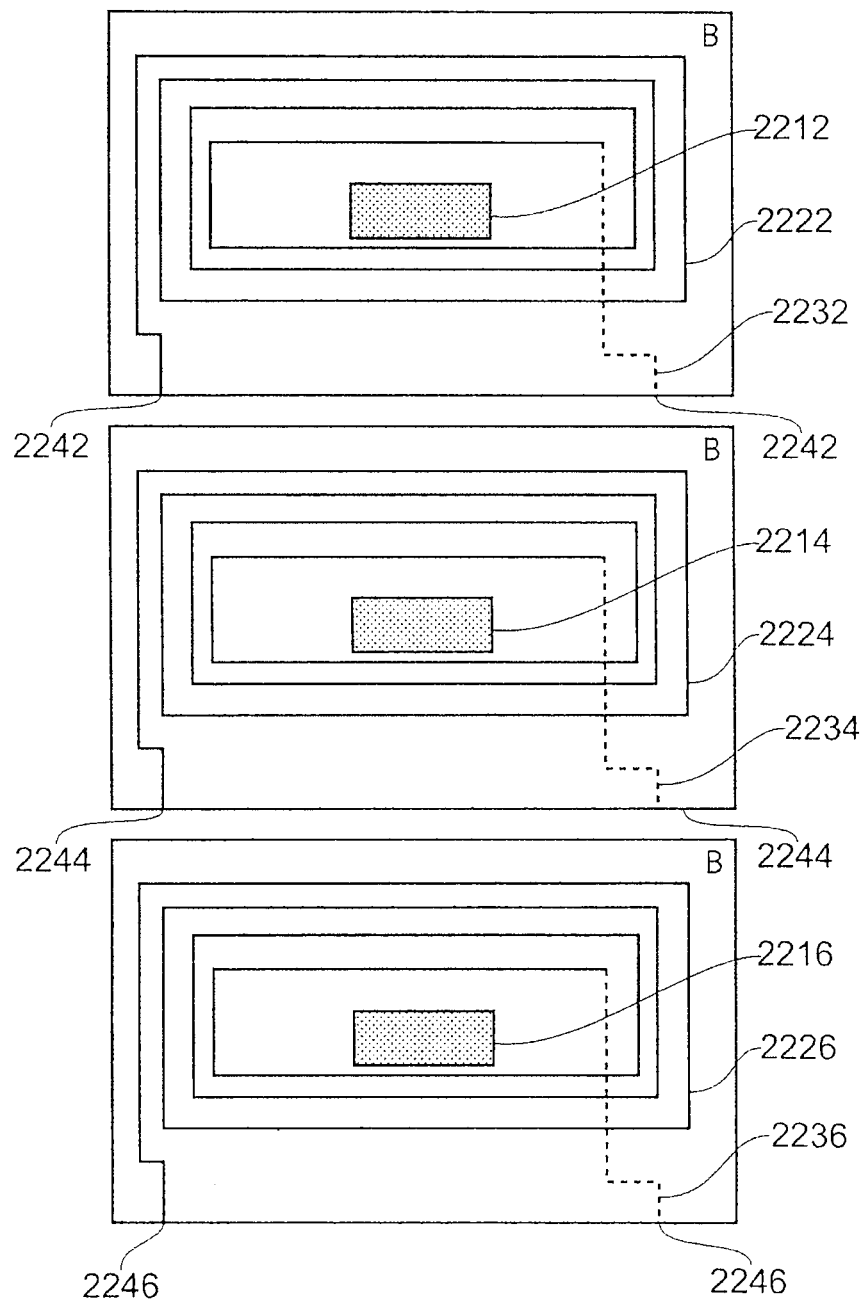
Figure 7C:
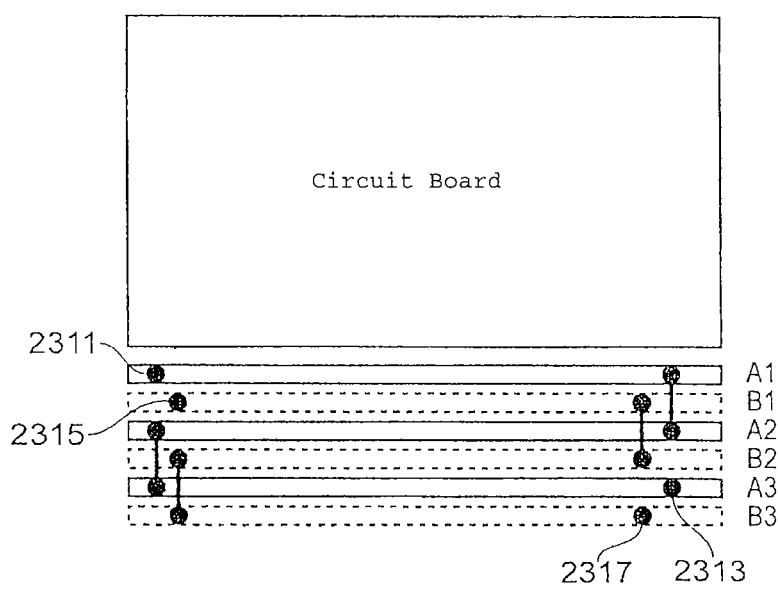

Referring to FIGS. 7A to 7C, a second configuration of a planar transformer, utilising a alternating design, is schematically illustrated. Referring first to FIG. 7A, a primary winding is formed over three identical cards A, each with a core receiving aperture 2112, 2114, 2116, a first side winding track 2122, 2124, 2126, a second side winding track 2132, 2134, 2136 and the same terminal positions 2142, 2144, 2146 at the edge of the respective card. Each of the primary cards is intended for location in a respectively labelled slot in FIG. 7C. A secondary winding is shown in FIG. 7B, and is formed over three identical cards B, again each with a core receiving aperture 2212, 2214, 2216, a first side winding track 2222, 2224, 2226, a second side winding track 2232, 2234, 2236 and the same terminal positions 2242, 2244, 2246 at the edge of the respective card. Each of the secondary cards is located at a respectively labelled slot in FIG. 7C. FIG. 7C illustrates six slots of a motherboard to which the PCB transformer (in the form of the six cards of FIGS. 7A and 7B) is to be mounted. Connections between the slots in the motherboard serve to complete the circuits of the primary and secondary windings by connecting together the six cards. In a slot A1 dedicated to one of the A cards, an input connection 2311 is provided which serves as a first terminal for the primary winding. The other connection shown in slot A1 is used to connect to the slot A2 dedicated to a second of the A cards. The slot A2 is connected to the slot A3 in a like manner. The slot A3 comprises an output connection 2313 which serves as a second terminal for the primary winding. In a slot B1 dedicated to one of the B cards, an input connection 2315 is provided which serves as a first terminal for the secondary winding. The other connection shown in the slot B1 is used to connect to the slot B2 dedicated to a second of the B cards. The slot B2 is connected to the slot B3 in a like manner. The slot B3 comprises an output connection 2317 which serves as a second terminal for the secondary winding. The edge terminals of the cards are identical in this embodiment, and the terminals within subsequent slots of a particular winding are alternated in orientation to permit connections between slots. In this case, current flow reverses each time so that the cross-slot connection can alternate between one end of the slot and the other. An advantage of this configuration is that each of the primary cards (A) can be the same (no need to step the terminal positions), and each of the secondary cards (B) can be the same.

A method of manufacturing a transformer is envisaged, comprising the steps of:

providing a first plurality of cards carrying portions of a primary winding, and a second plurality of cards carrying portions of a secondary winding, each portion comprising an electrically conducting track having two terminals at one edge of the card;

providing a board having a plurality of slots for receiving the first plurality of cards and the second plurality of cards, the slots being electrically connected together; and inserting the first plurality of cards and the second plurality of cards into the plurality of slots; wherein the electrical connections within the plurality of slots complete a circuit with the first plurality of cards to form the primary winding, and complete a circuit with the second plurality of cards to form the secondary winding.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A grid tied inverter connectable to an electricity grid, the grid tied inverter comprising a DC to DC current fed push-pull inverter operable to generate a current waveform from a DC voltage source, the current waveform being substantially synchronised to the electricity grid, the push-pull inverter comprising a transformer having first side winding connectable to a battery and a second side winding connectable to the grid, wherein
   a first end of the second side winding of the transformer is connected between a first diode and a second diode, the first diode and second diode being connected in series between a positive output rail and a negative output rail and being oriented in the same direction;
   a second end of the second side winding of the transformer is connected between a first capacitor and a second capacitor, the first capacitor and second capacitor being connected in series between the positive output rail and the negative output rail;
   a further winding is connected at one end between the first capacitor and the second capacitor, and is connected at its other end between a third diode and a fourth diode, the third diode and the fourth diode being connected in series between the positive output rail and the negative output rail and both being oriented in the same direction as the first diode and the second diode.

2. A system comprising the grid tied inverter according to claim 1 connected between a DC source and the grid.

3. The grid tied inverter according to claim 1, wherein the further winding has substantially the same number of turns as the second side transformer winding.

4. The grid tied inverter according to claim 1, wherein the further winding is connected at the one end to the first capacitor and the second capacitor via a resistor.

5. The grid tied inverter according to claim 1, wherein a resistor is connected across the first capacitor.

6. The grid tied inverter according to claim 1, wherein a resistor is connected across the second capacitor.

7. The grid tied inverter according to claim 1, wherein
   a first field effect transistor and a second field effect transistor arc connected in series between the positive rail and the negative rail, the body diodes of each or the first and second field effect transistors being oriented in the same direction; and
   the second end or the second transformer winding is connected between the first and second field effect transistors.

8. The grid tied inverter according to claim 7, wherein a fifth diode is connected in series with the first field effect transistor between the second end of the second winding and one of the positive and negative rails, the fifth diode being oriented in the opposition direction to the body diode of the first field effect transistor.

9. The grid tied inverter according to claim 8, wherein the fifth diode is a Schottky diode.

10. The grid tied inverter according to claim 8, wherein a sixth diode is connected in series with the second field effect transistor between the second end of the second winding and the other of the positive and negative rails, the sixth diode being oriented in the opposition direction to the body diode of the second field effect transistor.

11. The grid tied inverter according to claim 10, wherein the sixth diode is a Schottky diode.

12. A method of operating a grid tied inverter connectable to an electricity grid, the grid tied inverter comprising a DC to DC current fed push-pull inverter, the method comprising generating a current waveform from a DC voltage source, the current waveform being substantially synchronised to the electricity grid, the push-pull inverter comprising a transformer having first side winding connectable to a battery and a second side winding connectable to the grid, wherein a first end of the second side winding of the transformer is connected between a first diode and a second diode, the first diode and second diode being connected in series between a positive output rail and a negative output rail and being oriented in the same direction; a second end of the second side winding of the transformer is connected between a first capacitor and a second capacitor, the first capacitor and second capacitor being connected in series between the positive output rail and the negative output rail; a further winding is connected at one end between the first capacitor and the second capacitor, and is connected at its other end between a third diode and a fourth diode, the third diode and the fourth diode being connected in series between the positive output rail and the negative output rail and both being oriented in the same direction as the first diode and the second diode.

13. The method according to claim 12, wherein the further winding has substantially the same number of turns as the second side transformer winding.

14. The method according to claim 12, wherein the further winding is connected at the one end to the first capacitor and the second capacitor via a resistor.

15. The method according to claim 12, wherein a resistor is connected across the first capacitor.

16. he method according to claim 12, wherein a resistor is connected across the second capacitor.

17. The method according to claim 12, wherein a first field effect transistor and a second field effect transistor are connected in series between the positive rail and the negative rail, the body diodes of each of the first and second field effect transistors being oriented in the same direction; and the second end of the second transformer winding is connected between the first and second field effect transistors.

18. The method according to claim 17, wherein a fifth diode is connected in series with the first field effect transistor between the second end of the second winding and one of the positive and negative rails, the fifth diode being oriented in the opposition direction to the body diode of the first field effect transistor.

19. The method according to claim 18, wherein the fifth diode is a Schottky diode.

20. The method according to claim 18, wherein a sixth diode is connected in series with the second field effect transistor between the second end of the second winding and the other of the positive and negative rails, the sixth diode being oriented in the opposition direction to the body diode of the second field effect transistor.

21. The method according to claim 20, wherein the sixth diode is a Schottky diode.

22. A non-transitory, tangible computer readable storage medium including instructions which, when loaded onto and executed by a computer configure the computer to perform the method according to claim 12.

* * * * *